US00RE41043E

(19) United States
(12) Reissued Patent
Han

(10) Patent Number: US RE41,043 E
(45) Date of Reissued Patent: Dec. 15, 2009

(54) DUPLEX PRINTING METHOD OF PRINTING APPARATUS HAVING DUPLEX PRINTING FUNCTION

(75) Inventor: Ho-Sung Han, Gyeonggi-do (KR)

(73) Assignee: Samsung Electronics Co., Ltd., Suwon-si (KR)

(21) Appl. No.: 11/438,122

(22) Filed: May 22, 2006

Related U.S. Patent Documents

Reissue of:
(64) Patent No.: 6,741,819
Issued: May 25, 2004
Appl. No.: 10/200,757
Filed: Jul. 24, 2002

(30) Foreign Application Priority Data

Dec. 15, 2001 (KR) ..... 2001-79716

(51) Int. Cl.
*G03G 15/00* (2006.01)

(52) U.S. Cl. ..... 399/82
(58) Field of Classification Search ..... 399/82, 399/85, 364
See application file for complete search history.

(56) References Cited

U.S. PATENT DOCUMENTS 6,148,164 A * 11/2000 Shima ..... 399/82
6,192,208 B1 * 2/2001 Maekawa ..... 399/82
6,256,463 B1 * 7/2001 Manzer et al. ..... 399/82
6,282,388 B1 * 8/2001 Obata ..... 399/82
6,470,156 B1 * 10/2002 Sahay ..... 399/82

* cited by examiner

*Primary Examiner*—Susan S Lee
(74) *Attorney, Agent, or Firm*—Stanzione & Kim LLP

(57) ABSTRACT

A duplex printing method in a printing apparatus having a duplex printing function printing incoming print data on both sides of a print sheet includes sequentially converting the incoming print data into images corresponding to respective pages and storing the images of the pages, determining whether there are the images having two side pages to be printed on both sides of a single sheet among the images of the pages, if it is determined that there are the images having the two side pages, forming a dual queue having both odd page image related information and even page image related information corresponding to the two side pages, variably scheduling a printing sequence of the pages to be printed using the dual queue and performing the duplex printing function, and repeating the above operations until all of the incoming print data are completely received and printed. Therefore, a memory can be efficiently used, and the scheduling of the printing sequence of the pages to be printed can be simplified.

56 Claims, 3 Drawing Sheets

DUPLEX PRINTING METHOD OF PRINTING APPARATUS HAVING DUPLEX PRINTING FUNCTION

Matter enclosed in heavy brackets [ ] appears in the original patent but forms no part of this reissue specification; matter printed in italics indicates the additions made by reissue.

CROSS-REFERENCE TO RELATED APPLICATIONS

This application claims the benefit of Korean Application No. 2001-79716, filed Dec. 15, 2001, in the Korean Industrial Property Office, the disclosure of which is incorporated herein by reference.

BACKGROUND OF THE INVENTION

1. Field of the Invention

The present invention relates to a duplex printing method of a printing apparatus such as a printer or a copier, and more particularly, to a duplex printing method in which a sequence of pages to be printed is determined using a page backup algorithm in a state of a printer engine error, such as paper jam or paper empty, in order to print print data on both sides of a print sheet.

2. Description of the Related Art

A block diagram of a typical printing apparatus having a duplex printing function is shown in FIG. 1. The printing apparatus shown in FIG. 1 includes an interface unit 10, a controller 12, a memory 14, an image forming unit 16, and a sheet handler 18.

The controller 12 converts print data received from an external source through the interface unit 10 into images, stores the images in the memory 14, and transmits the images corresponding to respective pages to be printed to the image forming unit 16 in a predetermined printing sequence. The image forming unit 16 prints a received image on a sheet picked up by the sheet handler 18. The image forming unit 16 and the sheet handler 18 are parts that actually perform a printing function and are collectively referred to as a printer engine.

The controller 12 includes a scheduler (not shown) determining the printing sequence of the respective pages to be printed, an interpreter (not shown) processing the received print data, and a video controller (not shown). The image forming unit 16 forms an image on a corresponding sheet. The sheet handler 18 handles sheets and includes a duplex loop (not shown) for a duplex printing function.

Generally, the printing apparatus having the duplex printing function is provided with the duplex loop so that the duplex printing function can be implemented under the control of the controller 12. The duplex loop is an apparatus handling (processing) sheets for the duplex printing function.

The duplex loop is denoted by a reference numeral 28 shown in FIG. 1 of U.S. Pat. No. 6,069,704 and is also shown in FIG. 1 of U.S. Pat. No. 5,488,458 as a duplex loop path denoted by a reference numeral 13. Thus, a description about structure and operations of the duplex loop will be omitted.

Scheduling methods of determining the printing sequence of the pages to be printed for the duplex printing function in the printing apparatus such as a printer are different from each other depending on the number of sheets handled by the printer. That is, the scheduling methods are different from each other depending on the number of sheets which can be accommodated (disposed) in the duplex loop of the printer at a time, i.e., the number of sheets accommodated in the duplex loop during a period from the picking-up of the sheets to the printing out of the sheets. The number of sheets accommodated and handled in the duplex loop at a time indicates the number of sheets which can be processed in accordance with the duplex printing function in bulk and is hereinafter simply referred to as a duplex loop capacity.

The duplex loop capacity varies with a length of the duplex loop and the size of a sheet. As an example, it is assumed that sheets of the same size are accommodated and handled in the duplex loop. However, the present invention is not limited to the sheets of the same size.

If the duplex loop capacity of the printer is N, the video controller of the printer must be provided with 1N pages. For example, in a case where the duplex loop capacity is 5, when 10 pages are to be printed, the pages to be printed would be scheduled in order of second page→fourth page→sixth page→eighth page→tenth page→first page→third page→fifth page→seventh page→ninth page. Here, if there are only nine pages to be printed, the position of the tenth page should be skipped and processed as a null page. If there is a continuous printing job following the above printing job, the skipped part should be minimized to minimize a duplex cycle and the like. The method of scheduling the printing sequence of the pages to minimize a duplex cycle is disclosed in a U.S. Pat. No. 6,069,704.

However, the continuous printing job is sometimes interrupted or abruptly terminated. There may occur a processing error, such as paper jam or toner empty, in terms of mechanical characteristics of the printer or copier or a physical error such as paper empty in terms of a capacitive limit of a paper cassette.

In the above case, the printer can operate at a full speed only after the controller 12 generates image data corresponding to respective ones of the pages in the form of a bitmap or a similar form such as a display list or a compressed bitmap throughout the ten pages.

If the processing on the fifth page is delayed after completing the processing on first through fourth pages, or if a memory overflow occurs, it is needed to print just four pages in advance. As described above, the page scheduling needs to be changed depending on circumstances due to a capacity limit of the controller itself and a physical limit of the printing apparatus.

All cases which the errors can occur while the duplex printing function is performed in the printer will be reviewed. As an example, it is assumed that the duplex loop capacity is 2 in all of the following cases.

1. Continuous Duplex Printing or Fast Duplex Printing Mode

For example, when 8 pages are printed on both sides of 4 sheets, the printing sequence may be 2→4→1→6→3→8→5→7. Here, the numerals, such as 1 and 2, indicate page numbers. That is, numeral 2 indicates a second page.

In the fast duplex printing mode, at the moment that a next page to be printed is determined immediately after printing of the second page is completed, the fourth page should be prepared in the form of the bitmap or the similar form such as the display list or the compressed bitmap.

This mode allows a maximum engine efficiency in the printer having the duplex loop capacity of 2 to be accomplished.

2. Normal Duplex Printing or Normal Duplex Printing Mode

When 8 pages are printed, the printing sequence may be 2→1→4→3→6→5→8→7. This printing mode can occur in the following state.

First, it occurs when the third and fourth pages are not prepared at the moment of printing of a next page after the second page is completely printed, due to very complicated data or an insufficient capacity of a memory.

Second, it occurs when sheets are used in the printer engine having the duplex loop capacity of 2. In other words, long sheets may not be allowed by the duplex loop having the duplex loop capacity of 2 in terms of characteristics of the printing apparatus.

3. Continuous and Normal Duplex Printing Mode

When 10 pages are printed, the printing sequence may be 2→1→4→6→3→8→5→7→10→9.

This mode occurs when processing of the third and fourth pages and processing of the ninth and tenth pages are delayed or when the size of the sheets is large. In other words, this occurs when only the normal duplex printing mode is performed in the printing apparatus.

4. Duplex Printing Mode after Instant Engine Stop

For example, there may be three cases of the printing sequence.

Case 1: 2→engine error and stop→2→4→1→6→3→8→5→7

Case 2: 2→4→engine error and stop→2→4→1→6→3→8→5→7

Case 3: 2→4→1→engine error and stop→4→6→3→8→5→7

In the case 1 where the printer engine stops due to an engine error after the second page is printed, only the second page of a pair of the first and second pages has been printed, so the printing function restarts from the second page.

In the case 2 where the printer engine stops after the fourth page is printed, a pair of the first and second pages and a pair of the third and fourth pages have not been completely printed, so the printing function restarts from the second page.

In the case 3 where the printer engine stops after a pair of the first and second pages are completely printed, the printing function restarts from the fourth page.

In the above cases, the printer engine stops instantly after the paper jam. In the case 1, the paper jam occurs on the fourth page. In case 2, the paper jam occurs on the first page. In case 3, the paper jam occurs on the sixth page.

5. Duplex Printing Mode after Delaying Engine Stop

For example, there may be three cases of the printing sequence.

Case 4: 2→engine error→1→engine stop→4→6→3→8→5→7

Case 5: 2→4→engine error→1→3→engine stop→6→8→5→7

Case 6: 2→4→1→engine error→3→engine stop→4→6→3→8→5→7

In the case 4, the engine error occurs after the second page is printed, and the printer engine stops after printing the first page paired with the second page on a picked-up sheet.

In the case 5, the engine error occurs after the fourth page is printed, and the printer engine stops after printing the first and third pages paired with the second and fourth pages, respectively.

In the case 6, the engine error occurs after a sheet on which the fourth page is printed is picked up and the first page is printed, and the printer engine stops after printing the third page paired with the fourth page.

In the above cases, when the engine error occurs due to the paper empty or toner empty, the printer engine stops after a next page paired with a previously printed page that has been printed on a picked-up sheet is printed.

As described above, when a duplex loop capacity is greater than 1, the scheduling and determining the printing sequence of the pages to be printed varies in accordance with a state of the video controller, a printer engine, or print data.

However, the conventional duplex printing methods are performed only in a fixed (unchangeable) mode, so the mode cannot be changed between the fast duplex printing mode and the normal duplex printing mode, thereby decreasing efficiency of managing the memory.

In other words, when the scheduler of the controller 12 waits for a next print command to print a next page according to a predetermined order in the fast duplex printing mode according to the conventional duplex printing method, a first side page of a sheet printed in response to a previous printing command must be maintained in a memory until the print data corresponding to a second side page paired with the first side page to print both sides of the sheet in response to the printing command are converted into an image corresponding to the second side page, so the memory cannot be efficiently managed.

In this case, it is necessary to print the first side page for which the printing command has been made as soon as possible in order to securely provide a greater memory area and to thus increase the efficiency of managing the memory for the next page. However, according to the conventional duplex printing methods, since the duplex printing function is performed only in a fixed mode, the efficiency of the memory decreases. As a result, the printing efficiency decreases.

Moreover, according to the conventional duplex printing method, the printer is operated only in the fixed mode even if the error occurs, so the duplex printing function cannot be optimally performed in a variety of circumstances.

SUMMARY OF THE INVENTION

To solve the above and other problems, it is an object of the present invention to provide a duplex printing method in a printing apparatus having a duplex printing function in which two pages to be printed on both sides of a single sheet are stored in a single queue. An even page is discriminately processed from an odd page in order to variously schedule a printing sequence of the pages to be printed according to circumstances so that an optimal duplex printing function can be performed.

Additional objects and advantages of the invention will be set forth in part in the description which follows and, in part, will be obvious from the description, or may be learned by practice of the invention.

To achieve the above and other objects according to an embodiment of the present invention, there is provided a duplex printing method in a printing apparatus having a duplex printing function printing incoming print data on both sides of a print sheet. The duplex printing method includes sequentially converting the incoming data into images in units of a page and storing the images corresponding to respective pages, determining whether there are images of two side pages to be printed on both sides of the single sheet among the images of the pages, if it is determined that there are the images of the two side pages, forming a dual queue including both odd page image related information and even page image related information for the two side pages, variably scheduling a printing sequence of the pages to be printed using the dual queue and performing the duplex printing function, and repeating the above operations until all of the incoming print data is completely received and printed.

According to an aspect of the present invention, in the scheduling of the printing sequence, when the pages to be printed are complex because the pages have a great amount of data of when an image of a page to be printed next is not prepared due to an insufficient memory, another page whose image has been prepared in printed.

According to another aspect of the present invention, in scheduling of the printing sequence, a fast duplex printing mode or normal duplex printing mode is variably selected according to circumstances, and a page of the dual queue to be printed is determined according to the selected duplex printing mode before performing the duplex printing function.

According to still another aspect of the present invention, in the scheduling of the printing sequence, when the size of a sheet is allowed in the normal mode duplex printing mode only, the page in the dual queue to be printed is determined according to the normal duplex printing mode.

According to yet another aspect of the present invention, in the scheduling of the printing sequence, in a case of an error, the printing sequence of the pages to be printed is rescheduled to a new printing sequence to newly print pages which have not been completely printed due to the error before performing the duplex printing function.

According to still yet aspect of the present invention, the duplex printing method further includes determining whether the two even and odd pages related to the dual queue are completely printed, releasing (erasing the pages of the dual queue from) a memory related to the dual queue and repeating the above operation when it is determined that the two pages are completely printed, and scheduling the printing sequence when it is determined that the two pages are not completely printed.

According to also another aspect of the present invention, in the forming of the dual queue, the dual queue includes a dual queue page ID indicating the dual queue including the two pages, even and odd page IDs indicating even and odd pages, respectively, of the dual queue, and even and odd copy values indicating the numbers of copies of the even and odd pages, respectively, of the dual queue.

According to another embodiment of the present invention, there is provided another duplex printing method in the printing apparatus having the duplex printing function printing the incoming print data on both sides of the print sheet. The duplex printing method includes sequentially converting the incoming print data into images in units of a page and storing the images corresponding to respective pages, determining whether there are the images of two side pages to be printed on both sides of a single print sheet among the images of the pages, if it is determined that there are the images of the two side pages, forming a dual queue including both odd page image related information and even page image related information for the two side pages, variably scheduling another printing sequence of the side pages to be printed using the dual queue and performing the duplex printing function, determining whether the two even and odd pages related to the dual queue are completely printed, releasing (erasing the side pages from) a memory related to the dual queue when it is determined that the two side pages are completely printed, and performing the scheduling of the printing sequence when it is determined that the two side pages are not completely printed.

The duplex printing method further includes after operations of forming the dual queue, scheduling the printing sequence, determining whether the print data is being received, and performing the converting of the incoming data into images in units of a page when it is determined that the print data is being received, and when it is determined that the print data is not being received, determining whether the printing is completed, ending the duplex printing function when it is determined that the printing is completed, and repeating the scheduling of the printing sequence when it is determined that the printing is not completed.

According to an aspect of the present invention, in the forming of the dual queue, the dual queue includes a dual queue page ID indicating the dual queue including the two side pages, even and odd page IDs indicating even and odd pages, respectively, of the dual queue, and even and odd copy values indicating the numbers of copies of the even and odd pages, respectively, of the dual queue.

According to another aspect of the present invention, the scheduling of the printing sequence includes determining the dual queue each page of which is to be printed according to a predetermined scheduling method, determining whether to print the odd or even page of the dual queue based on the even and odd copy values, determining whether the error has occurred, and repeating the determining of the dual queue when it is determined that an error has occurred, when it is determined that the error has not occurred, determining whether to pick up a new sheet according to the determined odd or even page, printing the determined odd or even page on the newly picked-up print sheet, and reducing the even copy value by one when the determined even page is printed and reducing the odd copy value by one when the determined odd page is printed.

According to still another aspect of the present invention, in the determining of the dual queue, when pages to be printed are complex due to a great amount of data of the pages or when an image of a page to be printed next is not prepared due to the insufficient memory, it is determined that the page whose image has been prepared is printed.

According to yet another aspect to the present invention, in the determining of the dual queue, the fast duplex printing mode or normal duplex printing mode is variably selected according to the circumstances, and the dual queue each page of which is to be printed is determined according to the selected duplex printing mode.

According to still yet aspect to the present invention, in the determining of the dual queue, when the size of a sheet is allowed in the normal mode duplex printing only, the page in the dual queue to be printed is determined according to the normal duplex printing mode.

According to also another aspect to the present invention, when it is determined the error has occurred, in the determining of the dual queue, the even or odd copy value of the page which has not been completely printed due to the error is increased by 1 to newly print the page.

According to also another aspect to the present invention, when only one copy of the even and odd pages is needed, it is determined that the even page is printed when the even copy value is the same as the odd copy value, and it is determined that the odd page is printed when the even copy value is 0 and the odd copy value is 1.

According to also another aspect to the present invention, in a case where at least two copies of the even and odd pages are needed, it is determined that the odd page is printed if (the odd copy value−even copy value)>=2 or the even copy value is 0, otherwise it is determined that the even page is printed.

According to further another aspect to the present invention, in the determining of whether the error has occurred, a first error in which a printer engine instantly stops is discriminated from a second error in which the printer engine stops after the printing function is performed on a sheet already picked up, and in the determining of the dual queue, the printing sequence of pages to be printed is variably determined according to the error.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF INVENTION

Figure 1:
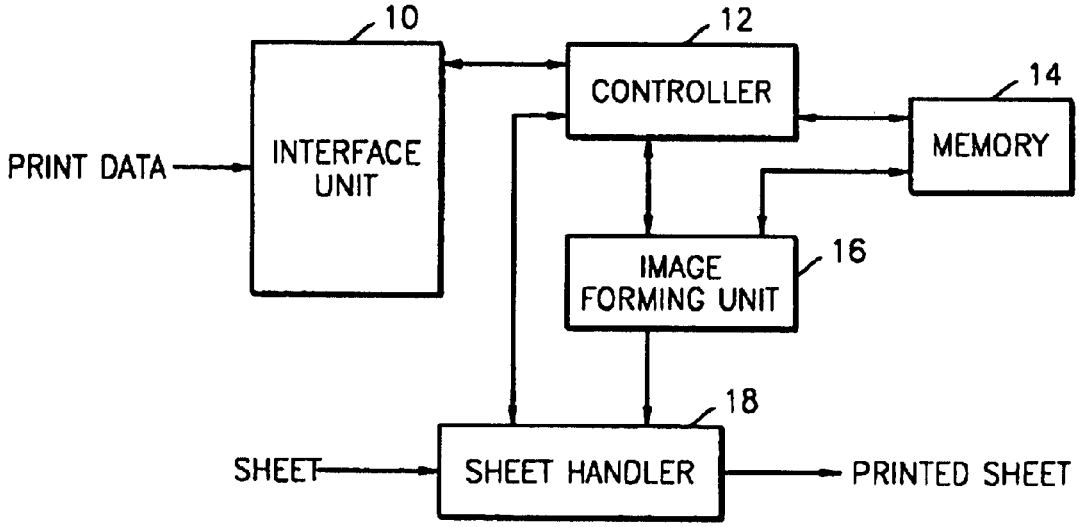
FIG. 1 is a block diagram of a conventional printing apparatus having a duplex printing function.

Reference will now be made in detail to the present preferred embodiments of the present invention, examples of which are illustrated in the accompanying drawings, wherein like reference numerals refer to the like elements throughout. The embodiments are described below in order to explain the present invention be referring to the figures.

Hereinafter, an embodiment of the present invention will be described in detail with reference to the attached drawings.

In a duplex printing method in a printing apparatus having a duplex printing function according to an embodiment of the present invention, two side pages (an even page and an odd page) to be printed on both sides of a single sheet are stored in a single queue, and the even page is discriminately (separately) processed from the odd page so as to variously schedule a printing sequence of the side pages to be printed so that the optimal dual printing function can be accomplished. The variable page scheduling can be performed in accordance with various circumstances with only software which is implemented in and incorporated with the duplex printing method without using additional hardware so that a memory of the printing apparatus can be efficiently managed.

Figure 2:
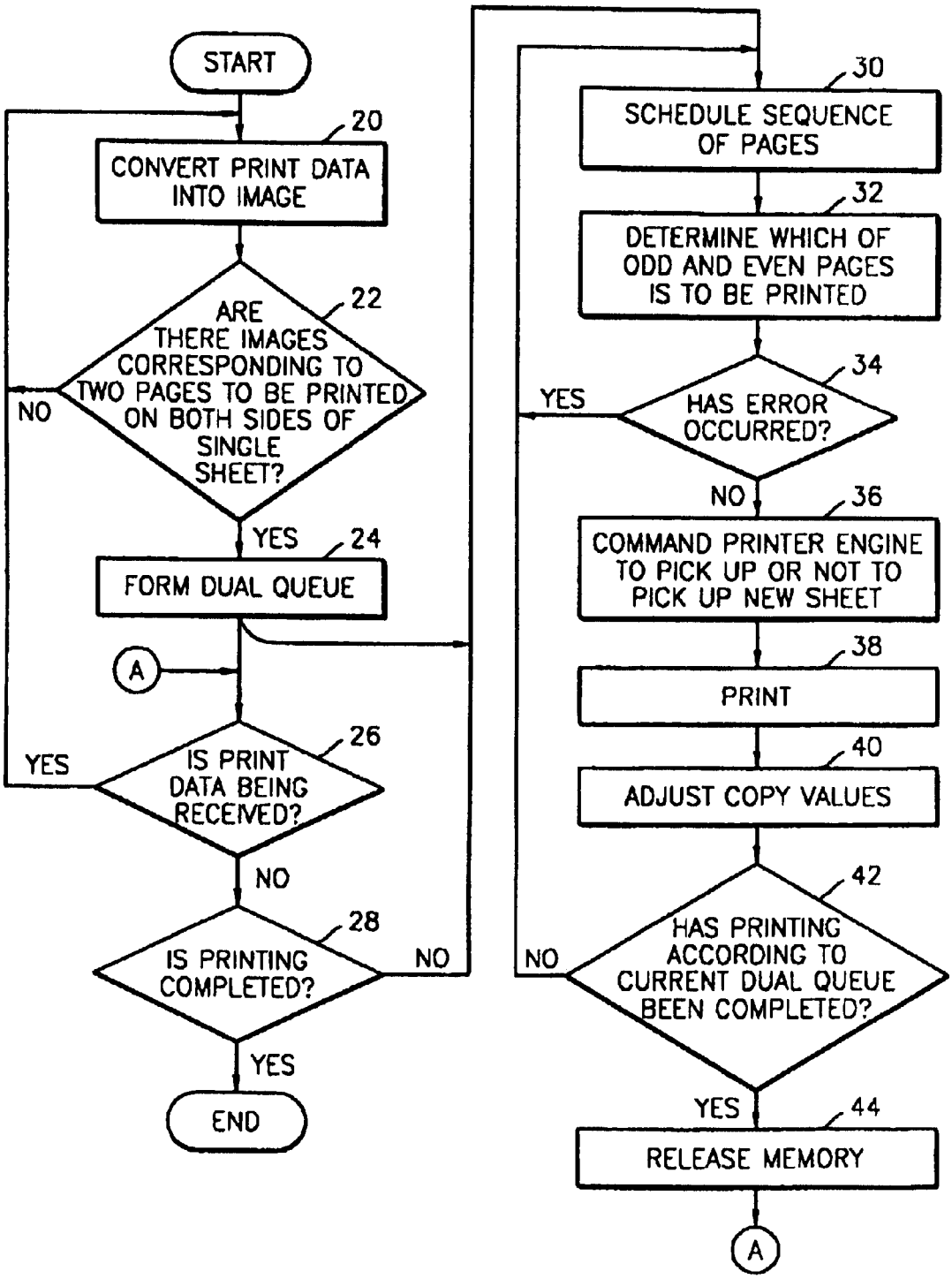
FIG. 2 is a flowchart of a duplex printing method in a printing apparatus having a duplex printing function according to an embodiment of the present invention.

FIG. 2 is a flowchart of the duplex printing method in a printing apparatus having a duplex printing function. The duplex printing method of FIG. 2 can be performed in a typical printing apparatus of FIG. 1.

The duplex printing method of FIG. 2 may be performed by a controller 12 of FIG. 1. The controller 12 controls an interface unit 10, the memory 14, the image forming unit 16, and a sheet handler 18 to perform the duplex printing function on the sheet. The image forming unit 16 and the sheet handler 18 are hereinafter referred to as a print engine.

Incoming print data is converted into sequential images in units of a page and the images corresponding to respective pages are stored in operation 20. It is determined whether there are the images corresponding to the two side pages which are to be printed on both sides of a single sheet among the stored images of the pages in operation 22. Hereinafter, the images are referred as to respective ones of images corresponding to one of the side pages (the odd and even pages).

If it is determined that there are the images corresponding to two side pages in operation 22, a dual queue having odd page image information about the odd page and even page image information about the even page is formed with respect to the two side pages in operation 24. The dual queue will be described in detail later.

In operations 30 through 40, the variable printing sequence of the pages to be printed is determined based on the dual queue, and then a printing command is transmitted to the printer engine to perform the duplex printing function. In operation 42, it is determined whether the two even and odd pages related to the dual queue have completely been printed. If it is determined that the two even and odd pages related to the dual queue have not completely been printed, the operation 30 repeats.

If it is determined that the two even and odd pages related to the dual queue have completely been printed, a memory relating to the dual queue is released to erase the images or the dual queue relating to the images which have been printed in operations 44, and the operation 26 repeats. After operations 24 and 44, it is determined whether the print data is being received in operation 26. If it is determined that the print data is being received, the operation 20 repeats.

If it is determined that the print data is not being received in operation 26, it is determined whether the printing of the pages is completed in operation 28. If it is determined that the printing of the pages is completed, the procedure ends. If it is determined that the printing of the pages is not completed, the operation 30 repeats.

The duplex printing method in the printing apparatus having the duplex printing function will be described below in more detail.

In operation 20, the controller 12 converts the print data received from the interface unit 10 into sequential images corresponding to respective pages and stores the images in the memory 14 in units of a page. That is, the images corresponding pages to be printed are prepared. In operation 22, it is determined whether there are the images of two side pages to be printed on both sides of the single sheet among the images stored in operation 20. That is, it is determined whether there are the images of two even and odd pages to be printed on both sides of the single sheet among the stored images before forming the dual queue.

In operation 24, the dual queue is formed. The forming of the dual queue will be described below in detail.

When an interpreter of the controller 12 completes the conversion of the print data corresponding to a single page (one of the side pages) into an image after receiving the print data, the interpreter generates a printing command based on page information (such as size and source of a sheet and application/non-application of the duplex printing function) about the single page and the bitmap type (such as a compressed bitmap or a display list) of the single page. This operation is referred to as "page check-in." If the page check-in is completed with respect to the two side pages to be printed on both sides of the single sheet, the information about the two side pages are incorporated into a single queue in operation 24. This is possible because two pieces of the page information about the two side pages are the same in the duplex printing function.

Accordingly, the single queue includes the common page information of the two side pages and data of the bitmap type of each of the two side pages. Hereinafter, the single queue is referred to as the dual queue.

In operation 24, an odd copy value and an even copy value are set. The odd copy value indicates a total of copies of the odd page to be printed, and the even copy value indicates a total of copies of the even page to be printed. The two odd and even copy values are the same in an initial stage but vary with a printing process. The odd and even copy values are used as important factors for scheduling the printing sequence of the pages to be printed.

When a user wants just one copy, each of the initial odd and even copy values is set to 1. When a user wants three copies, each of the initial odd and even copy values is set to 3. Each of the odd and even copy values is reduced in operation 40 after each page is printed.

Figure 3:
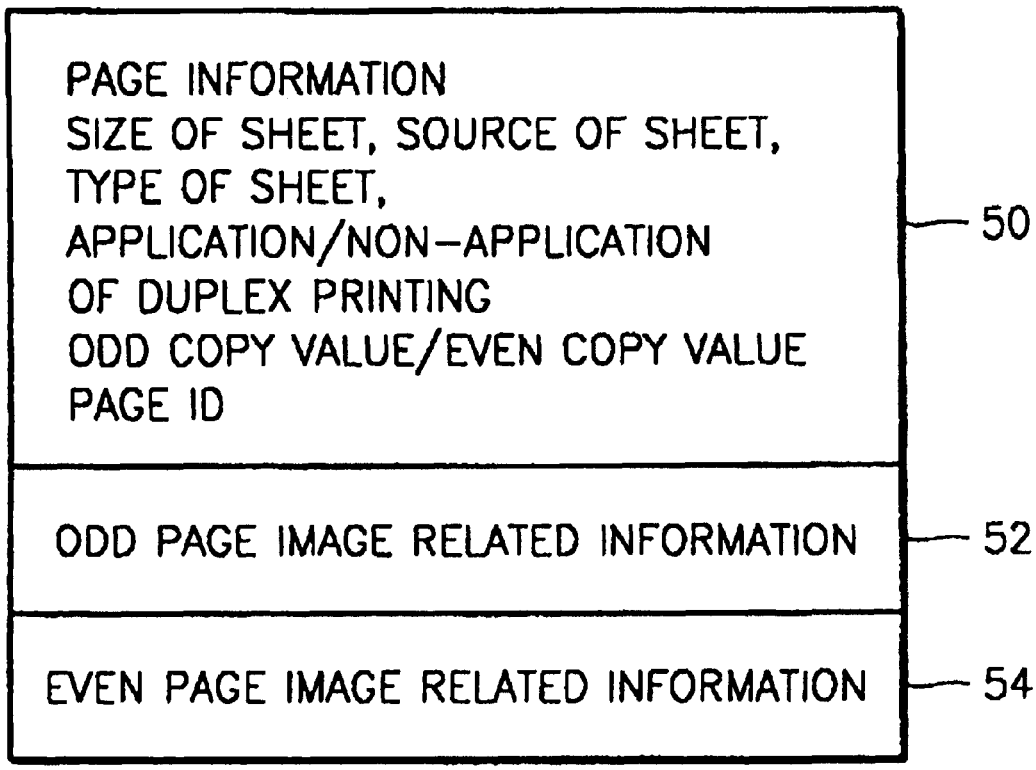
FIG. 3 is a diagram of a dual queue of FIG. 2.

FIG. 3 is a diagram of a structure of the dual queue. The dual queue includes page information 50, odd page image related information 52, and even page image related information 54 as shown in FIG. 3. The page information 50 includes the size of the sheet, the source of the sheet, the type of sheet, application/non-application of the duplex printing function, the odd copy value, the even copy value, and a page ID. The odd page image related information 52 indicates the image of the odd page, and the even page image related information 54 indicates the image of the even page.

In operation 30, the variable printing sequence of the pages to be printed is scheduled based on the dual queue formed in operation 24. This step will be described in detail later.

In operation 32, it is determined which of the odd and even pages is to be printed based on the odd copy value and the even copy value contained in the dual queue determined in the scheduling in operation 30. A determination method is as follows.

When only one copy of the two odd and even pages is needed, the even page is printed prior to the odd page. Accordingly, if the even copy value is the same as the odd copy value, it is determined that the even page is to be printed. If the even copy value is 0 and the odd copy value is 1, it is determined that the odd page is to be printed. In this operation, the printing process is not performed, but it is just determined which of the odd and even pages will be printed.

When a plurality of copies of the two odd and even pages are needed, if (odd copy value−even copy value) is equal to or greater than 2 or if the even copy value is 0, it is determined that the odd page is to be printed. Otherwise, it is determined that the even page is to be printed.

In operation 34, it is determined whether the error has occurred in the printer engine before printing the even or odd page determined as being printed. Here, a first error instantly stopping the printer engine is discriminated from a second error stopping the printer engine after the printing process is performed on the sheet already picked up. If it is determined that the error has occurred, an error state is reflected on the scheduling operation 30. If it is determined that there is no error, the operation 36 repeats.

In operation 36, the printer engine is commanded to pickup or not to pick up a new sheet for printing in accordance with a printing command. When it is determined that the even page is to be printed, the printer engine is commanded to pick up a new sheet. When it is determined that the odd page is to be printed, the printer engine is commanded not to pick up the new sheet. The operation 38 is performed to print the even page on one side of a new sheet and to print the odd page on the other side of the new sheet having the one side on which the even page has been printed after being picked up.

In operation 38, the printing command is transmitted to the printer engine, and the page determined as being printed is actually printed on the sheet.

In operation 40, the even copy value is reduced by 1 when the even page has been printed, and the odd copy value is reduced by 1 when the odd page has been printed. These adjusted odd and even copy values are used to determine which one of the even and odd pages is to be printed in operation 32 and are used as a reference for a determination in operation 42.

In operation 42, it is determined whether printing according to the current dual queue has been completed. In other words, it is determined whether both odd and even copy values are zero. If it is determined that both odd and even copy values are zero, it is concluded that a printing job with respect to the two odd and even pages is completed, and the procedure goes to operation 44 to release the memory. If it is determined that the printing according to the current dual queue has not been completed, the procedure goes to operation 30 to continue the current printing job according to the current dual queue.

If it is determined that the printing process according to the current dual queue has been completed, a memory area occupied for the two side pages is released to be erased and to be usable for another dual queue or the images of the pages to be printed in operation 44.

The scheduling of the sequence in operation 30 will be described hereinafter.

The scheduling of the sequence includes selecting the dual queue for printing the pages or adjusting copy values.

Selecting of the dual queue will be described first. The page information contained in the dual queue includes the page ID of the dual queue, i.e., a dual queue page ID. The dual queue according to which the printing process will be performed is determined based on the dual queue page ID.

In the case of the above-described fast duplex printing mode, the printing sequence of pages 2 (page 2)→4 (page4) →1 (page 1)→6 (page 6)→3 (page 3)→8 (page 8)→5 (page 5)→7 (page 7), can be reformed into 1E→2E→1O→3E→2O→4E→3O→4O based on the dual queues. Here, numerals 1, 2, 3, and 4 are the dual queue page IDs, and characters O and E indicate the odd page and the even page, respectively.

For example, 1O and 1E represent page 1 and page 2 (odd and even pages of a first sheet), respectively, 2O and 2E represent page 3 and page 4 (odd and even pages of a second sheet), respectively, 3O and 3E represent page 5 and page 6 (odd and even pages of a third sheet), respectively, and 4O and 4E represent page 7 and page 8 (odd and even pages of a fourth sheet), respectively.

In the case of the normal duplex printing mode, the sequence of pages, 2 (page 2)→1 (page 1)→4 (page 4)→3 (page 3)→6 (page 6)→5 (page 5)→8 (page 8)→7 (page 7), can be reformed into 1E→1O→2E→2O→3E→3O→4E→4O based on the dual queues. In the scheduling of the sequence in operation 30, scheduling of the dual queues according to the printing sequence of one of the fast duplex printing mode or the normal duplex printing mode is determined according to following conditions. The conditions are related to the above-described cases and will be described in the following examples.

First, in a case where the size of sheets is allowed in the normal duplex printing mode only, the dual queues are scheduled according to the printing sequence of the normal duplex printing mode in operation 30. Otherwise, the dual queues are scheduled according to the printing sequence of the fast duplex printing mode.

Second, when the pages are complicated or when there are no images of the pages in advance due to the insufficient memory, for example, a new printing sequence of the pages may be determined (rescheduled) as 2→1→4→6→3→8→5→7→10→9, so the printing sequence of the dual queues is 1E→1O→2E→3E→2O→4E→3O→4O→5E→5O. For an example, the page 4 or 2E is supposed to be printed after the page 2 or 1E is printed, but the page check-in for a pair of the pages 3 and 4 has not been performed yet. In other words, the new printing sequence is determined on the pages with respect to which the page check-in has been performed in operation 30, but the dual queue for the pages 3 and 4 is not obtained in operation 30. In such case, the page 1 is scheduled (rearranged) to be printed prior to the page 4 according to the new printing sequence.

Third, in a case where the printer engine stops and delays the printing process after the engine error occurs, the new printing sequence of the pages may be 2→engine error→1→engine stop→4→6→3→8→5→7. As an example, if the error (for example, the paper empty state) in which the printer engine cannot pick up the new sheet any more occurs when the page 4 is about to be printed after the page 2 is printed, the error is detected in operation 34, and the scheduling of the pages is immediately performed again in operation 30 so that the page 1 can be printed according to the new printing sequence.

The adjustment of the copy values is described in detail hereinafter.

When the scheduling of the pages is performed in response to the error, the even and odd copy values are adjusted. In this case, the error (for example, paper jam) in which the printer engine instantly stops occurs, and it is necessary to newly print a previously printed page.

The conventional printing sequence of the pages, for example, 2→4→engine error and stop→2→4→1→6→3→8→5→7, can be reformed into 1E→2E (1O and 2O were not to be printed) → 1E→2E→1O→3E→2O→4E→3O→4O according to the new printing sequence of the pages of the dual queues. In this case, when the error (for example, paper jam) in which the printer engine stops occurs while the page 1 is being printed after the page 4 is printed, a sheet for a dual queue 1 (for the pages 1 and 2) is damaged, and the page 3 of a dual queue 2 (for the pages 3 and 4) has not been printed yet, so it is necessary to newly perform the printing process starting from the pages 1 and 2 of the dual queue 1 on the damaged sheet. For this printing job process, the copy values are adjusted. In other words, when such error occurs, the even copy values for the dual queues 1 and 2 are increased by 1, and then the scheduling of the pages is performed again.

The duplex printing method in the printing apparatus having the duplex printing function according to an embodiment of the present invention simplifies the scheduling of the printing sequence of pages without using additional hardware by forming the dual queue controlling two side pages together, thereby securing the printing apparatus to be integrated. In addition, the scheduling of the sequence is performed on the pages only in the scheduler and varies between the fast duplex printing mode and the normal duplex printing mode during one printing process, so that efficiency of the memory can be increased. If the scheduler waits for the page check-in for a next page in order to support the fast duplex printing mode only, the pages that have been checked in must be maintained, thereby wasting the memory area. However, according to the present invention, the checked-in pages are printed as soon as possible to secure the memory for the next pages, thereby increasing the efficiency in managing the memory.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A duplex printing method in a printing apparatus having a duplex printing function to print incoming print data on both sides of a single print sheet, the duplex printing method comprising:

sequentially converting the incoming print data into images corresponding to respective pages and storing the images of the pages;

determining whether there are the images having two side pages to be printed on both sides of the single print sheet among the images of the respective pages;

[if it is determined]] *wherein* upon determining that there are the images having the two side pages, formingt a dual queue having both odd page image related information and even page image related information corresponding to the two side pages, respectively;

variably scheduling a printing sequence of the pages to be printed using the dual queue and performing the duplex printing function; and repeating the converting of the incoming print data, the determining of whether there are the images having the two side pages, the forming of the dual queue, and the scheduling of the printing sequence until the incoming print data is completely received and printed.

2. The duplex printing method of claim 1, wherein the scheduling of the printing sequence comprises:

when a page to be printed is complex or when an image of the page to be printed next is not prepared due to an insufficient memory, printing another page which has been prepared.

3. The duplex printing method of claim 1, wherein the scheduling of the printing sequence comprises:

selecting one of a fast duplex printing mode and a normal duplex printing mode according to circumstances, and determining the dual queue having the two-side page to be printed according to the selected one of the fast and normal duplex printing modes before performing the duplex printing function.

4. The duplex printing method of claim 3, wherein the scheduling of the printing sequence comprises:

when the normal duplex printing mode is selected in response to a size of the sheet, determining a page in the dual queue to be printed according to the normal duplex printing mode.

5. The duplex printing method of claim 1, wherein the scheduling of the printing sequence comprises:

in a case of an error of the printing apparatus, rescheduling the printing sequence of the pages to be printed in order to newly print the pages on which a printing process is not completely performed due to the error before the duplex printing function is performed.

6. The duplex printing method of claim 1, further comprising;

determining whether even and odd pages related to the two side pages of the dual queue are completely printed;

erasing the dual queue and performing the converting of the incoming print data, the determining of whether there are the images having the two side pages, the forming of the dual queue, and the scheduling of the printing sequence upon determining whether the two side pages are completely printed; and scheduling the sequence of the pages upon determining that the two side pages are not completely printed.

7. The duplex printing method of claim 1, wherein the dual queue comprises:

a dual queue page ID indicating the dual queue including the two side pages;

even and odd page IDs indicating even and odd pages, respectively, of the dual queue; and even and odd copy values indicating the numbers of copies of the even and odd pages, respectively.

8. A duplex printing method in a printing apparatus having a duplex printing function printing incoming print data on both sides of a print sheet, the duplex printing method comprising:

sequentially converting the incoming print data into images corresponding to respective pages and storing the images of the pages;

determining whether there are the images having two side pages to be printed on both sides of the single print sheet among the images of the respective pages;

upon determining that there are the images of the two side pages, forming a dual queue having both odd page image related information and even page image related information corresponding to the two side pages, respectively;

variably scheduling a printing sequence of the pages to be printed the dual queue and performing the duplex printing function;

determining whether even and odd pages relating to the two side pages of the dual queue are completely printed, erasing the dual queue upon determining that the two even and odd pages are completely printed, and rescheduling the printing sequence of the pages upon determining that the two side pages are not completely printed;

determining whether the incoming print data are being received and performing the converting of the incoming print data upon determining that the incoming print data are being received; and upon determining that the incoming print data are not being received, determining whether a printing process of the pages is completed, terminating the converting of the incoming print data upon determining that the printing process is completed, and scheduling the printing sequence upon determining that the printing process of the pages is not completed.

9. The duplex printing method of claim 8, wherein the dual queue comprises:

a dual queue page ID indicating the dual queue including the two side pages;

even and odd page IDs indicating even and odd pages, respectively, of the dual queue; and even and odd copy values indicating the numbers of copies of the even and odd pages, respectively, of the dual queue.

10. The duplex printing method of claim 9, wherein the scheduling of the sequence comprises:

determining the dual queue having the pages to be printed according to a predetermined scheduling method;

determining whether to print the odd or even page of the dual queue based on the even and odd copy values;

determining whether an error has occurred in the printing apparatus and performing the determining of the dual queue upon determining that the error has occurred;

upon determining that the error has not occurred, performing the determining of whether to pick up a new sheet according to the page to be printed;

printing the determined odd or even page on the new sheet; and reducing the even copy value by one when the even page is printed and reducing the odd copy value by one when the odd page is printed.

11. The duplex printing method of claim 10, wherein the determining of the dual queue comprises:

when the pages to be printed are complex or when an image of a page to be printed next is not prepared due to insufficient memory, determining and printing another page whose image has been prepared.

12. The duplex printing method of claim 10, wherein the determining of the dual queue comprises:

selecting a fast duplex printing mode or a normal duplex printing mode according to circumstances, and determining one page of the dual queue to be printed according to the selected duplex printing mode.

13. The duplex printing method of claim 10, wherein the determining of the dual queue comprises:

when a size of a sheet is allowed in a normal duplex printing mode, determining the page of the dual queue to be printed according to the normal duplex printing mode.

14. The duplex printing method of claim 10, further comprising:

upon determining that the error has occurred, increasing the even or odd copy value for a page which has not been completely printed due to the error by 1 to newly print the page.

15. The duplex printing method of claim 10, further comprising:

when only one copy of the even and odd pages is needed, determining that the even page is printed when the even copy value is the same as the odd copy value; and determining that the odd page is printed when the even copy value is 0 and the odd copy value is 1.

16. The duplex printing method of claim 10, further comprising:

when at least two copies of the even and odd pages are needed, determining that the odd page is printed if a difference between the odd copy value and the even copy value is equal to or greater than 2 or the even copy value is 0, otherwise determining that the even page is printed.

17. The duplex printing method of claim 10, wherein the error comprises:

a first error in which a printer engine of the printing apparatus instantly stops; and a second error in which the printer engine stops after the printing process is performed on the print sheet already picked up, and determines the printing sequence of the pages to be printed according to the error.

18. A duplex printing method in a printing apparatus having a duplex printing function printing images on corresponding sides of print sheets, the duplex printing method comprising:

forming a dual queue indicating that the images includes two side images to be printed on both sides of one of the print sheets;

printing the images on the print sheet according to a printing sequence of the images; and modifying the printing sequence of the images in response to the dual queue when an error relating to the duplex printing function is detected in the printing apparatus.

19. The method of claim 18, wherein the modifying of the printing sequence comprises:

generating another printing sequence different from the printing sequence of the images; and printing the images according to the another printing sequence.

20. The method of claim 18, wherein the modifying of the printing sequence comprises:

when one of the side pages of the dual queue has been printed, printing the other one of the side pages of the dual queue prior to printing any other page of the images according to the modified printing sequence.

21. The method of claim 18, wherein the modifying of the printing sequence comprises:

changing a printing order of the at least two images in the printing sequence when the error occurs.

22. The method of claim 18, wherein the changing of the printing order comprises:

printing one of the two images prior to another one of the two images to be printed, the one of the two images being relating to the dual queue while another one of the two images does not relate to the dual queue.

23. The method of claim 18, wherein the error indicates that a printing engine relating to the duplex printing function is instantly stopped, and the modifying of the printing sequence comprises generating another printing sequence in accordance with the error.

24. The method of claim 18, wherein the printing apparatus comprises a controller controlling the printing sequence, and the error indicates that the controller does not receive data corresponding to one of the images.

25. The method of claim 18, wherein the printing apparatus comprises a memory storing data relating the images, and the error indicates that the memory does not have sufficient memory area to store the data corresponding to one of the images.

26. The method of claim 18, wherein the printing apparatus comprises a memory storing the two side images or the dual queue, and the modifying of the printing sequence comprises:

printing the images in accordance with the modified printing sequence; and erasing the two side images or dual queue when the two side images of the dual queue are printed in accordance with the modified printing sequence.

27. The method of claim 18, wherein the apparatus comprises a printing engine relating to the duplex function, and the error indicates that the printing engine will stop after one of the print sheets which has been already picked-up is completely printed.

28. The method of claim 18, wherein the error indicates that one of the print sheets is not supplied to complete the duplex printing function.

29. The method of claim 18, wherein the modifying of the printing sequence comprises:

when one of the side pages of the dual queue has been printed when the error occurs, changing a printing order of the at least two images in the printing sequence.

30. The method of claim 18, wherein the modifying of the printing sequence comprises:

completing the printing of the two side images on both sides of one of the print sheets if one of the two side images has been printed on one of the both sides of the one of the print sheets when the error occurs.

31. The method of claim 18, wherein the modifying of the printing sequence comprises:

printing a first portion of the images in accordance with the printing image when the error occurs; and printing a second portion of the images in accordance with the modified printing sequence after the error is removed, the second portion being the remaining portion of the images which have not been printed when the error occurs.

32. The method of claim 18, wherein the printing apparatus having a fast duplex printing mode and a normal duplex printing mode, and the printing sequence comprises a first printing sequence corresponding to the fast duplex printing mode and a second printing sequence corresponding to the normal duplex printing mode, the modifying of the printing sequence comprising:

modifying the first printing sequence to a third printing sequence when the printing apparatus is in the fast duplex printing mode; and modifying the second printing sequence to a fourth printing sequence when the printing apparatus is in the normal duplex printing mode.

33. A duplex printing method in a printing apparatus having a printing engine to perform a duplex printing function to print images on corresponding sides of print sheets, the duplex printing method comprising:

generating the first printing sequence to print the images on the print sheets in a first order; and generating a second printing sequence to print the images on the print sheets in a second order when an error is generated in the printing engine.

*34. The method of claim 33, wherein the error is generated in the printing engine in response to the complexity of one or more of the images to be printed.*

*35. The method of claim 33, wherein the error is generated in the printing engine in response to a first image to be printed in the second sequence having a different complexity than a second image printed in the first printing sequence.*

*36. The method of claim 33, wherein the error is generated in the printing engine in response to an insufficient remaining memory capacity of the printing apparatus to store a sufficient amount of data corresponding to a portion of the images corresponding to at least one of the sides of print sheets.*

*37. The method of claim 33, wherein the error is generated in the printing engine in response to data corresponding to a portion of the images to be printed next being not prepared.*

*38. The method of claim 33, wherein the error is generated in the printing engine in response to a print sheet jam.*

*39. The method of claim 33, wherein the error is generated in the printing engine in response to the print sheets being of a size suited for the second printing sequence.*

*40. The method of claim 33, wherein the printing of the images in the first printing sequence is faster than that in the second printing sequence.*

*41. The method of claim 33, wherein the error is generated in the printing engine in response to a processing delay in processing a portion of the images.*

*42. The method of claim 33, wherein the error is generated in the printing engine in response to a controller of the printing engine not receiving data corresponding to one of the images.*

*43. A duplex printing method in a printing apparatus having a duplex printing function to print images on corresponding sides of print sheets, the duplex printing method comprising:*

*generating a printing sequence to print the images on the print sheets, wherein the generating of the printing sequence comprises generating a first printing sequence to print the images on the print sheets in a first order and generating a second printing sequence to print the images on the print sheets in a second order in response to an error in the printing apparatus; and*

*printing the images on the print sheets according to the generated printing sequence.*

*44. The method of claim 43, wherein the error is generated in response to the complexity of one or more of the images to be printed.*

*45. The method of claim 43, wherein the error is generated in response to a first image to be printed in the second sequence having a different complexity than a second image printed in the first printing sequence.*

*46. The method of claim 43, wherein the error is generated in response to data corresponding to a portion of the images to be printed next being not prepared.*

*47. The method of claim 43, wherein the error is generated in response to a print sheet jam.*

*48. The method of claim 43, wherein the printing of the images in the first printing sequence is faster than that in the second printing sequence.*

*49. The method of claim 43, wherein the error is generated in response to a processing delay in processing a portion of the images.*

*50. A method of carrying out a print job containing a plurality of images to be printed on a plurality of two-sided print sheets, each of the plurality of two-sided print sheets having a first side and a second side, the method comprising:*

*printing a first set of the plurality of images in a first printing sequence that results in at least a first two consecutive ones of the plurality of two-sided print sheets being printed on the respective first side before the second side thereof being printed; and*

*printing a second set of the plurality of images in a second printing sequence that results in each of at least a second two consecutive ones of the plurality of two-sided print sheets being printed on both the first side and the second side before the next one of the second consecutive ones of the plurality of two-sided print sheets being printed.*

*51. The method of claim 50, wherein the printing of the second set of the plurality of images comprises printing the second set of the plurality of images in the second printing sequence in response to the complexity of one or more of the second set of the plurality of images.*

*52. The method of claim 50, wherein the printing of the second set of the plurality of images comprises printing the second set of the plurality of images in the second printing sequence in response to the second set of the plurality of images having a different complexity than the first set of the plurality of images.*

*53. The method of claim 50, wherein the printing of the second set of the plurality of images comprises printing the second set of the plurality of images in the second printing sequence in response to data corresponding to a portion of the second set of the plurality of images being not prepared.*

*54. The method of claim 50, wherein the printing of the second set of the plurality of images comprises printing the second set of the plurality of images in the second printing sequence in response to the second two consecutive ones of the plurality of two-sided print sheets being of a size suited for the second printing sequence.*

*55. The method of claim 50, wherein the printing of the plurality of images in the first printing sequence is faster than that in the second printing sequence.*

*56. The method of claim 50, wherein the printing of the second set of the plurality of images comprises printing the second set of the plurality of images in the second printing sequence in response to a processing delay in processing a portion of the second set of the plurality of images.*

* * * * *